United States Patent [19]

Mukawa

[11] 3,912,722
[45] Oct. 14, 1975

[54] NOVEL 6β-AMINO-STEROIDS AND PRODUCTION THEREOF

[75] Inventor: Fumikazu Mukawa, Mino, Japan

[73] Assignee: Shionogi & Co., Ltd., Osaka, Japan

[22] Filed: Nov. 30, 1973

[21] Appl. No.: 420,460

[30] Foreign Application Priority Data
Dec. 6, 1972   Japan.............................. 47-12265

[52] U.S. Cl............. 260/239.5; 260/239; 260/55 R; 260/397.2; 260/397.5; 424/241
[51] Int. Cl.²............................................ C07J /00
[58] Field of Search................................. 260/239.5

[56] References Cited
UNITED STATES PATENTS
3,123,623   3/1964   Sasaki.............................. 260/397.3
FOREIGN PATENTS OR APPLICATIONS
1,042,292   10/1966   United Kingdom.............. 260/397.4

Primary Examiner—Elbert L. Roberts
Attorney, Agent, or Firm—Wenderoth, Lind & Ponack

[57] ABSTRACT

Novel 6β-amino-steroids of the formula:

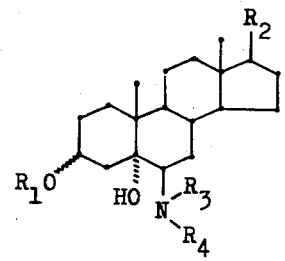

wherein $R_1$ is a hydrogen atom or an acyl group, $R_2$ is a hydrogen atom or an aliphatic hydrocarbon group, $R_3$ and $R_4$ are each a hydrogen atom or an alkyl group, or, taken together with the adjacent nitrogen atom and with or without another hetero atom, form a nitrogen containing heterocyclic ring, and salts thereof, useful as hypocholesterolemic agents, hypolipidemic agents, anti-tumor agents or antiviral agents.

6 Claims, No Drawings

NOVEL 6β-AMINO-STEROIDS AND PRODUCTION THEREOF

This invention relates to novel 6β-amino-steroids and salts thereof useful as hypocholesterolemic agents, hypolipidemic agents, anti-tumor agents or antiviral agents, and to a process for the preparation thereof. More particularly, the present invention is concerned with novel 6β-amino-steroids (I) of the formula:

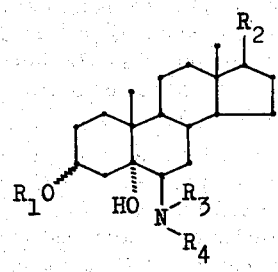

wherein $R_1$ is a hydrogen atom or an acyl group, $R_2$ is a hydrogen atom or an aliphatic hydrocarbon group, $R_3$ and $R_4$ are each a hydrogen atom or an alkyl group, or, taken together with the adjacent nitrogen atom and with or without another hetero atom, form a nitrogen containing heterocyclic ring; salts thereof; and to a process for the preparation thereof.

In accordance with the process of the invention, the desired 6β-amino-steroids(I) can be prepared by reacting a 5α,6α-epoxy-steroid (II) of the formula:

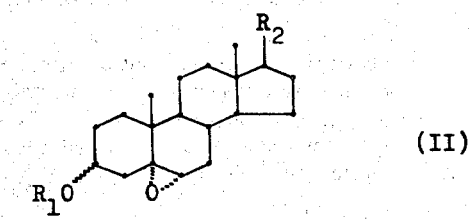

wherein $R_1$ is a hydrogen atom or an acyl group and $R_2$ is a hydrogen atom or an aliphatic hydrocarbon group, with an amine (III) of the formula:

wherein $R_3$ and $R_4$ are each a hydrogen atom or an alkyl group, or, taken together with the adjacent nitrogen atom and with or without another hetero atom, form a nitrogen containing heterocyclic ring.

In the formulae, $R_1$ stands for a hydrogen atom or an acyl group such as an alkanoyl group (e.g. formyl, acetyl, propionyl), aralkanoyl group (e.g. phenylacetyl, phenylpropionyl) or aryloyl group (e.g. benzoyl, toluoyl, phthaloyl). The substituent represented by $OR_1$ may be of α- or β-configuration. $R_2$ is a hydrogen atom or an aliphatic hydrocarbon group such as an alkyl or alkenyl group, having preferably up to 10 carbon atoms. Preferred hydrocarbon groups are methyl, ethyl, and the hydrocarbon substituents at position 17 of cholesterol, β-sitosterol or stigmasterol. When $R_3$ and $R_4$ represent an alkyl group, as examples of the said alkyl group may be mentioned alkyl groups having up to 10 carbon atoms such as methyl, ethyl, propyl, isopropyl, butyl, pentyl, hexyl, or adamantyl. $R_3$ and $R_4$ may alternatively form a nitrogen-containing heterocyclic ring such as piperidine, pyrrolidine, piperazine, morpholine, thiomorpholine, or N-alkylpiperazine, when taken together with the adjacent nitrogen atom and with or without another hetero atom.

The present process in accordance with the invention can be performed by the reaction between a 5α,6α-epoxy-steroid (II) and an amine (III) in the presence or absence of a solvent. The reaction proceeds generally under heating at a temperature of from 50°C to 300°C, preferably at 100°C to 200°C. The reaction is usually carried out in a polar solvent having a relatively high boiling point. Examples of such a solvent are ethylene glycol, propylene glycol, dimethylformamide, dimethylsulfoxide, alcohols with a high boiling point (e.g butyl alcohol, tertiary alcohol, amyl alcohol) and water. However, the reaction of the invention may proceed without such solvents, and an amount of amine (III) in excess of that undergoing reaction may serve as the reaction solvent. The present reaction is complete within a few to several-tens of hours, depending on the starting materials, solvent, and reaction temperature used. If necessary, the reaction may be carried out under an atmosphere of inert gas such as nitrogen or helium. After completion of the reaction, the desired 6β-amino-steroids (I) may be separated and purified by solvent extraction, evaporation under reduced pressure, recrystallization, chromatography, or other conventional method, or a combined method thereof.

The starting material, 5α,6α-epoxy-steroid (II), can be prepared by epoxidising a corresponding Δ⁵-steroid with an organic peracid, according to the method described in Helv. Chim. Acta 20, 244 (1937), Ann. Chem. 508, 215 (1934) or J. Chem. Soc. p. 738 (1936).

Examples of the other starting material, amine (III), are primary, secondary, and tertiary amines such as ammonia, alkylamines (e.g. methylamine, ethylamine, propylamine, isopropylamine, butylamine, tert-butylamine, dimethylamine, diethylamine, dipropylamine, dibutylamine, methylisopropylamine, or adamantylamine), and heterocyclic amines (e.g. piperidine, piperazine, pyrrolidine, morpholine, thiomorpholine, or N-alkylpiperazine in which the alkyl moiety contains up to 6 carbon atoms.).

When $R_1$ in 6β-amino-steroids (I) stands for a hydrogen atom and/or at least one of $R_3$ and $R_4$ is a hydrogen atom, the amino steroid (I) may be acylated, if desired. This acylation may be performed according to the usual method, and may usually be carried out in pyridine or a suitable basic solvent, although it may proceed in a neutral solvent. The acylation may be accelerated by the addition of a suitable inorganic or organic basic substance. Examples of the acylating agents available in this invention are various kinds of acylating agents employed in the art, such as acid anhydrides or acid halides of alkanoic acids (e.g. formic acid, acetic acid, propionic acid), aralkanoic acids (e.g. phenylacetic acid, phenylpropionic acid), or arylcarboxylic acids (e.g. benzoic acid, phthalic acid). Depending on the reaction conditions, starting materials, and acylating agents used, the acylation takes place at the hydroxy group of position 3 and/or at the amino group of position 6β in the steroid nucleus. The acylated product can be separated and isolated in a conventional manner involving recrystallization, fractional precipitation, chromatography, or other suitable method. In general, when the acylation with acetic anhydride is effected under mild conditions in pyridine at about room temperature, the hydroxy group at position 3 is predominantly acylated. Also, the amino-steroid (I) in which $R_1$ is an acyl group may be optionally deacylated by a known method to give the corresponding 3-hydroxy compound (I, $R_1$=H)

The 6β-amino-steroids (I) obtained by the process of the invention can be, after or without isolation, converted into inorganic or organic acid addition salts which are valuable for pharmaceutical purposes. Such suitable salts are the hydrochlorides, hydroiodides, sulfates, nitrates, phosphates, carbonates, formates, acetates, propionates, oxalates, succinates, tartarates, malates, citrates, benzoates, and salicylates. Also, the amino-steroids of the invention may be converted into the quaternary ammonium salts by the known method using an alkyl halide.

The 6β-amino-steroids of the invention possess strong hypolipidemic and hypocholesterolemic activities and they cause marked decreases in plasma levels of cholesterol, phospholipid, and triglyceride, and in the cholesterol/phospholipid ratio. For example, the test results on 6β-isopropylamino-5α-cholestane-3β,5-diol (A) and 6β-isopropylamino-stigmast-22-en-3β,5α-diol (B) are summarized in the following table.

| Group<br>No. of rats | Control<br>7 | A<br>7 | B<br>7 |
|---|---|---|---|
| Body weight (g±S.E.) | | | |
| Initial | 266±6.0 | 265±3.8 | 266±3.8 |
| Final | 295±8.1 | 286±5.0 | 289±4.7 |
| Gain (mean) | 29±3.0 | 20±2.4 | 23±2.5 |
| Plasma: | | | |
| Cholesterol (mg/dl±S.E.) | 57.9±0.9 | 42.3±0.7 (26.9%) | 48.1±1.3 (16.9%) |
| Phospholipid (mg Eq./dl±S.E.) | 106.8±4.6 | 86.4±1.9 (19.1%) | 102.0±1.8 (4.5%) |
| Triglyceride (mg/dl±S.E.) | 30.5±2.2 | 17.8±1.2 (41.6%) | 28.4±2.9 (6.9%) |
| Cholesterol/phospholipid (mean±S.E.) | 0.53±0.01 | 0.49±0.01 (7.5%) | 0.49±0.01 (7.5%) |
| Liver: | | | |
| Weight (g/100 g body weight) | 3.9±0.11 | 3.70±0.07 | 4.25±0.05 |
| Cholesterol | 2.70±0.06 | 2.72±0.05 | 2.76±0.06 |
| Phospholipid | 30.0±0.6 | 31.0±0.6 | 30.9±0.6 |
| Diet uptake (g/day/rat) | 18.6 | 16.5 | 16.9 |

Note: The numbers in parentheses of the "plasma" column are percent decreases. The test results were obtained in the following manner: Wistar male rats weighing 250–280 g were fed a diet with or without 0.03% test compounds daily for two weeks, and the decreases of lipid levels in plasma and liver were studied by colorimetric determination.

As shown in the table, the 6β-amino-steroids of the invention cause marked decreases in the level of plasma cholesterol and lipids. Also, such steroids do not show any significant effect on liver weight, liver cholesterol and liver phospholipid. Clofibrate, a well known hypolipidemic agent, has undesirable effects on liver. Therefore, such property of the present 6β-amino-steroids is valuable in view of clinical application.

Another advantage of the 6β-amino-steroids is that they do not inhibit normal cholesterol biosynthesis. Gas chromatographic analysis showed no accumlation of cholesterol biosynthesis intermediates such as desmosterol, which can usually be detected in the metabolites of nitrogen-containing steroids, in rats which had been subcutaneously injected with 6β-isopropylamino-5α-cholestane-3β,5-diol at a dose of 1 mg/day/rat for 10 days.

The acute toxicity of 6β-amino-steroids was studied using DS mice weighing 20–23 g. The drugs were administered by subcutaneous or oral route at various doses of the test compounds, and the mice were placed in a cage. The mortality was determined 72 hours after administration. The acute toxicities ($LD_{50}$ value) of 6β-isopropylamino-5α-cholestane-3β,5-diol and 6β-isopropylamino-stigmast-22-en-3β,5α-diol were both higher than 1000 mg/kg.

It should be noted that the test data described above are shown only with respect to specific example compounds. However, since the other compounds of this invention, as well as those described above have similar characteristics and advantages as medicaments, the 6β-amino-steroids of the present invention are highly useful and advantageous in the treatment or prevention of hypercholesterolemia, hyperlipidemia, atheromatous conditions and atherosclerosis of human beings and domestic animals.

The present 6β-amino-steroids can be administered orally or parenterally in per se conventional dosage forms, e.g. tablets, granules, powders, injections, liquids, suspensions or emulsions, optionally with suitable carriers, stabilizers, emulsifiers, preservatives, buffers, isotonizing agents and/or wetting agents, where a therapeutically active amount of active ingredient is present contained.

The effective dose can be easily determined by a physician on the basis of the data herein described. For example, a typical clinical dose range of the 6β-amino-steroids is approximately several hundred γ to several grams, preferably 300 mg to 1000 mg, for a normal adult.

The following examples are given solely for the purpose of illustration and are not to be construed as limitative of this invention, many variations of which are possible.

EXAMPLE 1

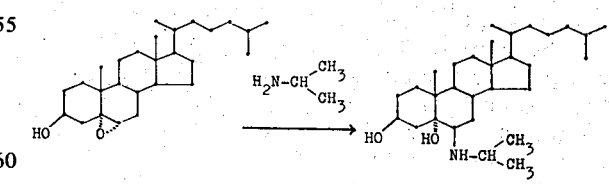

A suspension of 5α,6α-epoxy-cholesterol (6.5 g), triethylene glycol (160 ml) and isopropylamine (26 ml) is heated under an atmosphere of nitrogen gas at 180°C for 15 hours. The reaction solution is added to ice-water then extracted with chloroform. The chloroform extract is washed with water, dried over anhydrous sodium sulfate and evaporated under reduced pressure to give a residue. The residue is recrystallized from ethanol to give 4.54 g of 6β-isopropylamino-5α-cholestane-3β,5-diol, m.p. 170°–171°C, $[\alpha]_D^{24}$ −15.5° (c 0.5, chloroform), IR (KBr): 3528 (OH), 3282 (OH), 3192 (NH) cm$^{-1}$, NMR (CDCl$_3$) δ: 0.64 (18-CH$_3$), 0.73 (19-CH$_3$), 0.88, 0.86 (26-CH$_3$, 27-CH$_3$), 0.92, 0.96, 0.98, 1.02 (20-CH$_3$,

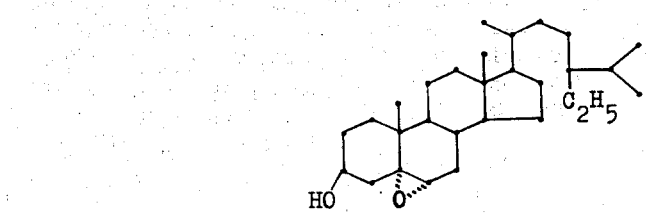

Anal. Calcd. for C$_{30}$H$_{55}$O$_2$N: C, 78.0; H, 12.0; N, 3.0. Found: C, 78.2; H, 12.1; N, 3.2.

The product (50 mg) is dissolved in chloroform saturated with dry hydrogen chloride and the solution is evaporated under reduced pressure to give crystals. Recrystallization from methanol-ethyl acetate gives 6β-isopropylamino-5α-cholestane-3β,5-diol hydrochloride in quantitative yield, m.p. 196°–197°C.

To a solution of 6β-isopropylamino-5α-cholesane-3β,5-diol (100 mg) in methylene chloride (2 ml) is added 20% acetic acid (10 ml), and the mixture is stirred. After removal of the methylene chloride layer, an aqueous saturated solution of sodium chloride is added to the aqueous layer to precipitate crystals, which are recrystallized from methanol-ether to give the corresponding acetate, m.p. 193°–194°C.

EXAMPLE 2

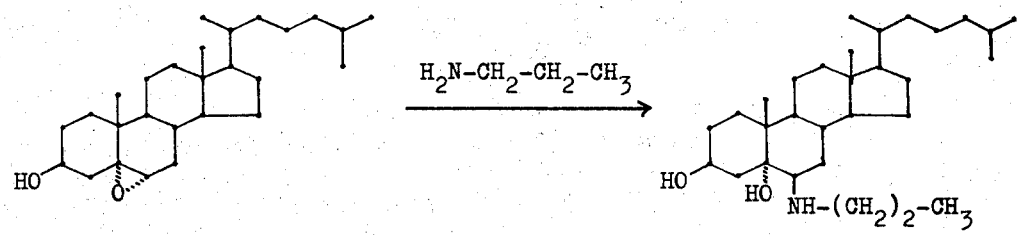

In the same manner as in EXAMPLE 1, but using 5α,6α-epoxy-cholesterol (0.3 g), triethylene glycol (5 ml) and propylamine (5.0 ml), 0.145 g of 6β-propylamino-5α-cholestane-3β,5-diol is obtained, m.p. 149°–152°C, $[\alpha]_D^{23}$ −14.1° (c 0.3, chloroform).

The product is dissolved in dry chloroform, then chloroform saturated with hydrogen bromide is added thereto. The mixture is allowed to stand at room temperature and then evaporated under reduced pressure. The resultant residue is recrystallized from an aqueous ethanol to give 6β-propylamino-5α-cholestane-3β,5-diol hydrobromide in quantitative yield, m.p. 218°–220°C (decomp.).

Anal. Calcd. for C$_{30}$H$_{57}$O$_2$N.HBr.H$_2$O: C, 64.2; H, 10.4; N, 2.4. Found: C, 64.4; H, 10.4; N, 2.5.

EXAMPLE 3

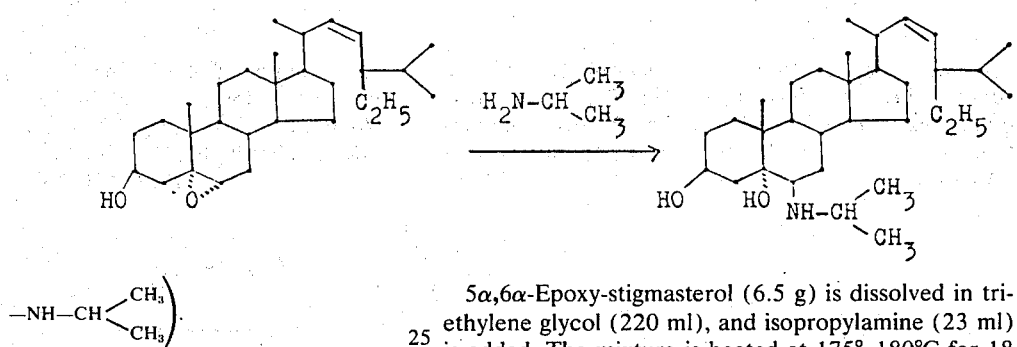

5α,6α-Epoxy-stigmasterol (6.5 g) is dissolved in triethylene glycol (220 ml), and isopropylamine (23 ml) is added. The mixture is heated at 175°–180°C for 18 hours. When the reaction is complete, the mixture is treated as in EXAMPLE 1 to give a residue. The residue is recrystallized from methylene chloride-n-hexane to afford 6β-isopropylamino-stigmast-22-en-3β,5α-diol, yield 4.0 g, m.p. 178°–179°C, $[\alpha]_D^{24}$ −24.2° (c 0.5, chloroform).

Anal. Calcd. for C$_{32}$H$_{57}$O$_2$N: c, 78.8; H, 11.8; N, 2.8. Found: C, 78.9; H, 11.8; N, 2.9.

The product (50 mg) is dissolved in methylene chloride (10 ml) then 10% tartaric acid is added with stirring. The aqueous phase is separated, and to it is added, dropwise, a saturated aqueous sodium chloride solution. The resultant crystals are collected by filtration and recrystallized from methanol-ether to give 6β-isopropylamino-stigmast-22-en-3β,5α-diol tartarate in quantitative yield, m.p. 194°–196°C.

EXAMPLE 4

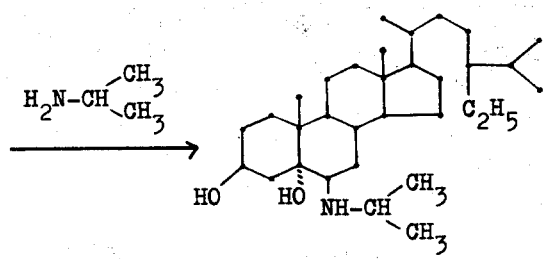

On using 5α,6α-epoxy-β-sitosterol (0.3 g), triethylene glycol (6 ml), and isopropylamine (0.8 ml), the same reaction as described in EXAMPLE 1 gives 6β-isopropylamino-stigmastane-3β,5α-diol, m.p. 156°–157°C, $[\alpha]_D^{24}$ −12.1° (c 0.5, chloroform).

Anal. Calcd. for $C_{32}H_{59}O_2N$: C, 78.5; H, 12.1; N, 2.9. Found: C, 78.1; H, 12.0; N, 2.7.

EXAMPLE 5

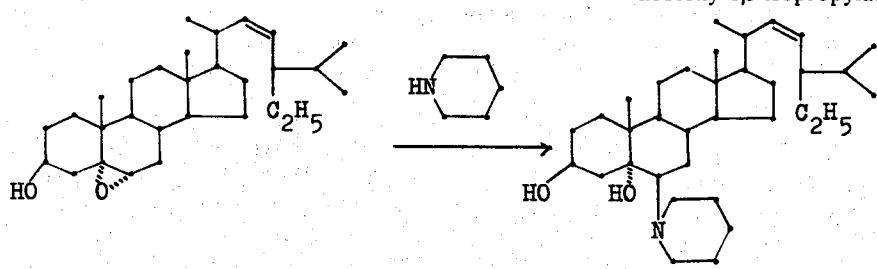

Triethylene glycol (5 ml) and piperidine (0.3 ml) are added to 5α,6α-epoxy-stigmasterol (0.3 g) and the mixture is heated at 165°–170°C for 7 hours. After completion of the reaction, the mixture is poured into ice-water and then extracted with chloroform. The extract is subjected to thin-layer chromatography on silica gel in a solvent system of chloroform: ethyl acetate:n-hexane=2:1:0.5 (v/v), thus yielding 0.11 g of 6β-piperidino-stigmast-22-en-3β,5α-diol, m.p. 167°–169°C, $[\alpha]_D^{24}$—20.5° (c 0.6, chloroform), IR (chloroform): 3350–3500 cm$^{-1}$.

Anal. Calcd. for $C_{34}H_{59}O_2N$: C, 79.4; H, 11.5; N, 2.7. Found: C, 79.2; H, 11.4; N, 2.7.

EXAMPLE 6

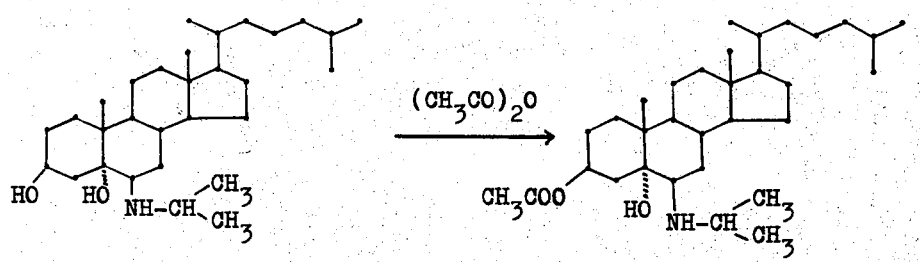

6β-Isopropylamino-5α-cholestane-3β,5-diol (50 mg) obtained in EXAMPLE 1 is added to a mixture of pyridine (1 ml) and acetic anhydride (0.5 ml) and the mixture is allowed to stand at room temperature. The product obtained is recrystallized from ether to give 35.4 mg of 3β-acetoxy-6β-isopropylaminocholestan-5α-ol, m.p. 76°–77°C, $[\alpha]_D^{23}$—20.5 (c 0.5, chloroform), IR (chloroform): 3300–3500, 1735 cm$^{-1}$.

Anal. Calcd. for $C_{32}H_{57}O_3N$: C, 76.2; H, 11.3; N, 2.7. Found: C, 76.1; H, 11.1; N, 2.9.

EXAMPLE 7

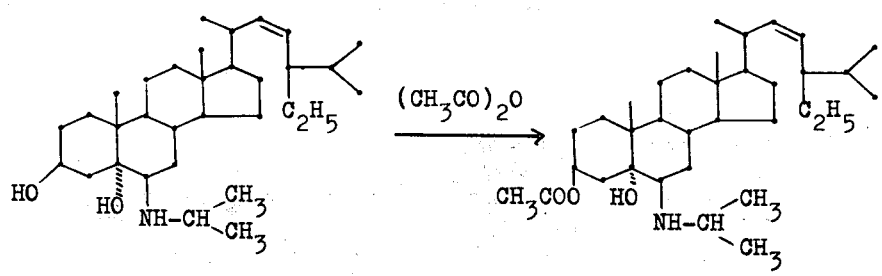

6β-Isopropylamino-stigmast-22-en-3β,5α-diol (50 mg), obtained as in EXAMPLE 3, is acetylated in the same manner as in EXAMPLE 6 to produce 3β-acetoxy-6β-isopropylaminostigmast-22-en-5α-ol, yield 34.8 mg, m.p. 81°–82°C, $[\alpha]_D^{23}$—25.6° (c 0.4, chloroform), IR (chloroform):3300–3500, 1735, 970 cm$^{-1}$.

Anal. Calcd. for $C_{34}H_{59}O_3N$: C, 77.0; H, 11.2; N, 2.6. Found: C, 76.9; H, 11.2; N, 2.5.

EXAMPLE 8

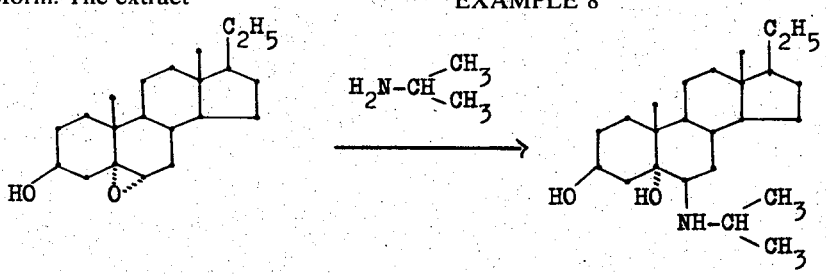

5,6α-Epoxy-5α-pregnan-3β-ol (5.6 g) is added to triethylene glycol (450 ml) containing isopropylamine (20 ml) and the mixture is heated in an oil bath at about 190°C for 18 hours. Working up the reaction mixture in the same manner as in EXAMPLE 1, 3.4 g of 6β-isopropylamino-5α-pregnane-3β,5-diol is obtained, m.p. 195°–196°C (recryst. from methanol), $[\alpha]_D^{23.5}$—33.3° (c 0.5, chloroform).

Anal. Calcd. for $C_{24}H_{43}O_2N$: C, 76.3; H, 11.4; N, 3.7. Found: C, 76.5; H, 11.4; N, 3.7.

The starting material, 5,6α-epoxy-5α-pregnan-3β-ol, can be prepared by the following procedure. To a solution of 5α-pregnen-3β-ol (6.8 g) in methylene chloride (150 ml) is added, dropwise, a solution of m-chloroperbenzoic acid (4.5 g) in methylene chloride (150 ml) with stirring at 0°C. After 3 hours, the reaction solution is treated in a conventional manner and the residue is crystallized from methanol, thus yielding 5,6α-epoxy-5α-pregnan-3β-ol, yield 5.7 g, m.p. 147°–148°C, $[\alpha]_D^{23.5}$—59.0° (c 0.49, chloroform).

EXAMPLE 9

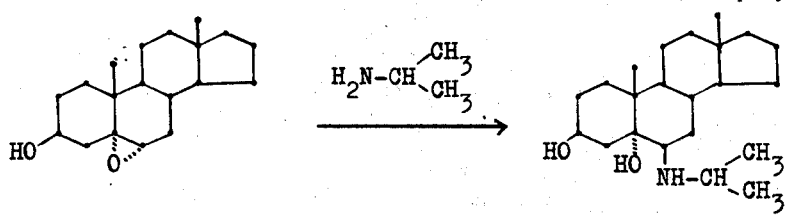

5,6α-Epoxy-5α-androstan-3β-ol (4.0 g) prepared by the method described in Ber. 75, 597 (1942) is heated in triethylene glycol (200 ml) together with isopropylamine (4.0 ml) at 175°–180°C for 10 hours. The reaction mixture is then poured into ice-water and extracted with chloroform. After removal of the solvent, the residue is recrystallized from methylene chloriden-hexane to give 6β-isopropylamino-5α-androstane-3β,5-diol, yield 1.941 g, $[\alpha]_D^{21}$ −47.9° (c 0.4, chloroform).

Anal. Calcd. for $C_{22}H_{39}O_2N$: C, 75.6; H, 11.2; N, 4.0. Found: C, 75.7; H, 11.2; N, 4.1.

EXAMPLE 10

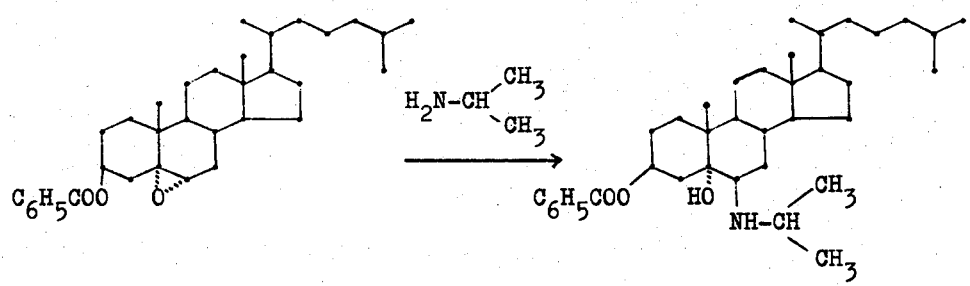

5α,6α-Epoxy-cholestan-3β-ol (200 mg) is heated together with adamantanamine (150 mg) and water (1.2 ml) in a sealed tube at 140°–145°C for 15 hours. The reaction solution is extracted with a mixed solvent of methylene chloride-methanol. The organic extract is dried over anhydrous sodium sulfate and concentrated under reduced pressure to give a residue. The residue is recrystallized from methylene chloride-methanol to give 6β-adamantylamino-5α-cholestane-3β,5-diol, yield 92 mg, $[\alpha]_D^{24.5}$ −7.9° (c 0.5, chloroform).

Anal. Calcd. for $C_{37}H_{63}O_2N$: C, 80.2; H, 11.4; N, 2.5. Found: C, 79.9; H, 11.4; N, 2.5.

EXAMPLE 11

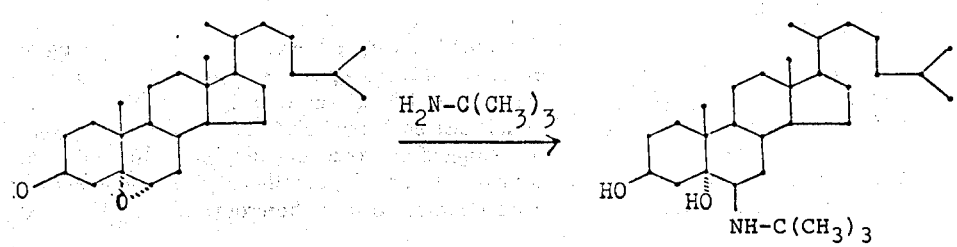

5α,6α-Epoxy-cholestan-3β-ol (0.5 g) is added to triethylene glycol (20 ml) and then tert.-butylamine (8 ml) is added. The mixture is heated in an oil bath at about 180°–185°C for 20 hours. Work-up in the same manner as in EXAMPLE 1 gives 0.28 g of 6β-tert.-butylamino-5α-cholestane-3β,5-diol, m.p. 166°–167°C (recryst. from ethanol), $[\alpha]_D^{24}$ −9.9° (c 0.4, chloroform).

Anal. Calcd. for $C_{31}H_{57}O_2N$: C, 78.2; H, 12.0; N, 2.9. Found: C, 78.0; H, 11.9; N, 2.7.

EXAMPLE 12

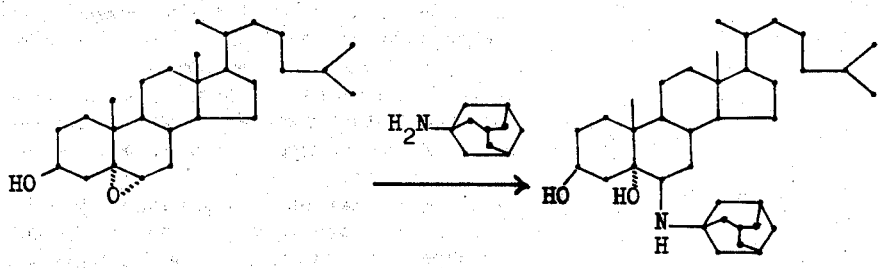

5,6α-Epoxy-5-cholestan-3β-ol benzoate (0.5 g) is dissolved in triethylene glycol (5 ml) and to this solution is added isopropylamine (0.5 ml). The mixture is heated at 180°C for about 18 hours. Work-up in the same manner as in EXAMPLE 1 gives 0.34 g of 3β-benzoyloxy-6β-isopropylamino-5α-cholestan-5-ol, m.p. 174°–176°C (recryst. from methanol), $[\alpha]_D^{25}$ −2.4° (c 0.47, chloroform), IR (chloroform): 3300–3500, 1780, 1610, 1590 cm$^{-1}$.

Anal. Calcd. for $C_{37}H_{59}O_3N$: C, 78.5; H, 10.5; N, 2.4. Found: C, 78.4; H, 10.3; N, 2.4.

The product obtained above can also be prepared in a manner similar to that described in EXAMPLE 6, by treating 6β-isopropylamino-5α-cholestane-3β,5-diol with benzoyl chloride, in place of the acetic anhydride used in EXAMPLE 6.

EXAMPLE FOR REFERENCE

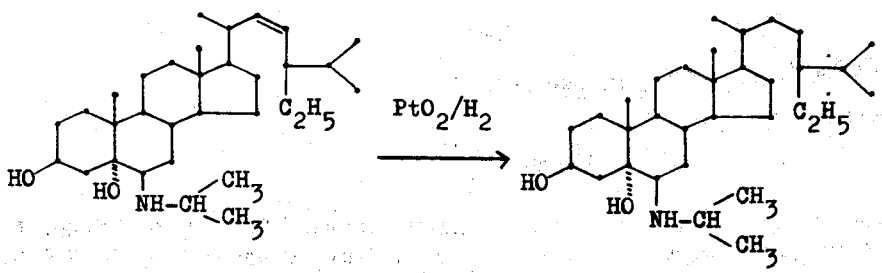

6β-Isopropylamino-stigmast-22-en-3β,5α-diol (0.2 g) is added to a mixture of ether and acetic acid (1:3 (v/v), 20 ml). After addition of platinic oxide (50 mg), the mixture is shaken in a hydrogen stream at normal pressure. After three hours, the catalyst is filtered off and the filtrate is adjusted to weakly alkaline pH with a dilute sodium carbonate solution. The alkaline solution is extracted with methylene chloride. The organic extract is treated in a conventional manner, to yield 6β-isopropylamino-stigmastane-3β,5α-diol, m.p. 155°–156°C (recryst. from methylene chloride-n-hexane). The product obtained is found to be identical to the compound obtained in EXAMPLE 4 by comparison of infrared absorption spectrum and mixed melting point.

What we claim is:

1. A compound selected from the group consisting of
6β-propylamino-5α-cholestane-3β,5-diol,
6β-isopropylamino-5α-cholestane-3β,5-diol,
6β-isopropylamino-stigmast-22-en-3β,5-diol,
6β-isopropylamino-stigmastane-3β,5α-diol,
6β-piperidino-stigmast-22-en-3β,5α-diol,
6β-isopropylamino-5α-pregnan-3β,5-diol,
6β-isopropylamino-5α-androstane-3β,5-diol,
6β-adamantylamino-5α-cholestane-3β,5-diol,
6β-tert.-butylamino-5α-cholestane-3β,5-diol,
3β-acetoxy-6β-isopropylamino-cholestan-5α-ol,
3β-acetoxy-6β-isopropylamino-stigmast-22-en-5α-ol, and
3β-benzoyloxy-6β-isopropylamino-5α-cholestan-5-ol.

2. A 6β-Amino-steroid selected from the group consisting of compounds of the formula

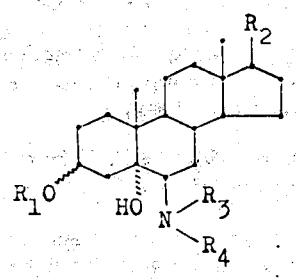

wherein
$R_1$ is a member selected from the group consisting of hydrogen, alkanoyl of 1–3 carbon atoms, aralkanoyl of 8–9 carbon atoms and aryloyl of 7–8 carbon atoms,
$R_2$ is a member selected from the group consisting of hydrogen, alkyl of up to 10 carbon atoms and alkenyl of up to 10 carbon atoms, and
$R_3$ and $R_4$ are each a member selected from the group consisting of hydrogen and alkyl of up to 10 carbon atoms, or $R_3$ and $R_4$, together with the adjacent nitrogen atom, form a heterocyclic ring selected from the group consisting of piperidine, pyrrolidine, piperazine, morpholine, thiomorpholine and N-alkylpiperazines wherein the alkyl group contains up to 6 carbon atoms,
and pharmaceutically acceptable salts thereof.

3. A 6β-Amino-steroid selected from the group consisting of compounds of the formula

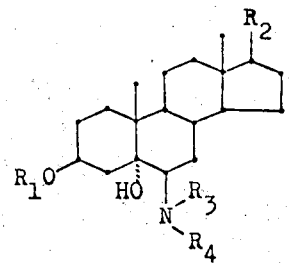

wherein
$R_1$ is a member selected from the group consisting of hydrogen, alkanoyl of 1–3 carbon atoms, aralkanoyl of 8–9 carbon atoms, and aryloyl of 7–8 carbon atoms,
$R_2$ is a member selected from the group consisting of hydrogen, alkyl or up to 10 carbon atoms and alkenyl of up to 10 carbon atoms, and
$R_3$ and $R_4$ are each a member selected from the group consisting of hydrogen and alkyl of up to 10 carbon atoms, or $R_3$ and $R_4$, together with the adjacent nitrogen atom, form a heterocyclic ring selected from the group consisting of piperidine, pyrrolidine, piperazine, morpholine, thiomorpholine and N-alkylpiperazines wherein the alkyl group contains up to 6 carbon atoms,
and pharmaceutically acceptable salts thereof.

4. A 6β-Amino-steroid selected from the group consisting of compounds of the formula

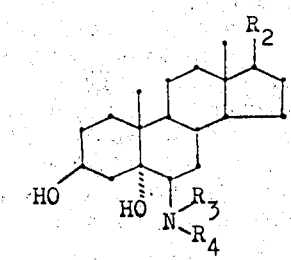

wherein
$R_2$ is a member selected from the group consisting of hydrogen, alkyl or up to 10 carbon atoms and alkenyl of up to 10 carbon atoms, and
$R_3$ and $R_4$ are each a member selected from the group consisting of hydrogen and alkyl of up to 10 carbon atoms, or $R_3$ and $R_4$, together with the adjacent nitrogen atom, form a heterocyclic ring selected from the group consisting of piperidine, pyrrolidine, piperazine, morpholine, thiomorpholine and N-alkylpiperazines wherein the alkyl group contains up to 6 carbon atoms,
and pharmaceutically acceptable salts thereof.

5. A 6β-Amino-steroid selected from the group consisting of compounds of the formula

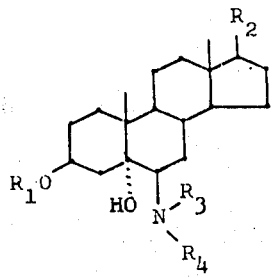

wherein
  $R_1$ is a member selected from the group consisting of hydrogen, formyl, acetyl, propionyl, phenylacetyl, phenylpropionyl, benzoyl, toluoyl and phthaloyl,
  $R_2$ is a member selected from the group consisting of hydrogen, methyl, ethyl, 1,5-dimethylhexyl, 1,5-dimethyl-4-ethylhexyl and 1,5-dimethyl-4-ethyl-2-hexenyl, and
  $R_3$ and $R_4$ are each a member selected from the group consisting of hydrogen, methyl, ethyl, propyl, isopropyl, butyl, pentyl, hexyl and adamantyl, or $R_3$ and $R_4$, together with the adjacent nitrogen atom, form a heterocyclic ring selected from the group consisting of piperidine, pyrrolidine, piperazine, morpholine, thiomorpholine and N-alkylpiperazines wherein the alkyl group contains up to 6 carbon atoms,
and pharmaceutically acceptable salts thereof.

6. A 6β-Amino-steroid selected from the group consisting of compounds of the formula

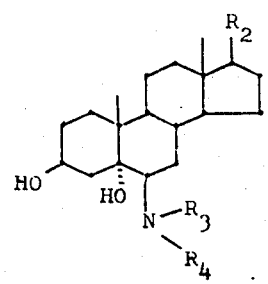

wherein
  $R_2$ is a member selected from the group consisting of hydrogen, ethyl, 1,5-dimethylhexyl, 1,5-dimethyl-4-ethylhexyl and 1,5-dimethyl-4-ethyl-2-hexenyl, and
  $R_3$ and $R_4$ are each a member selected from the group consisting of hydrogen, methyl, ethyl, propyl, isopropyl, butyl, pentyl, hexyl and adamantyl, or $R_3$ and $R_4$, together with the adjacent nitrogen atom, form a piperidine ring, and pharmaceutically acceptable salts thereof.

* * * * *